United States Patent Office 2,780,646
Patented Feb. 5, 1957

2,780,646

FATTY ACID AMIDES AND DERIVATIVES THEREOF

Joseph Seifter, Roy S. Hanslick, and Meier E. Freed, Philadelphia, Pa., assignors to American Home Products Corporation, New York, N. Y., a corporation of Delaware No Drawing. Application March 17, 1955,
Serial No. 495,038

8 Claims. (Cl. 260—562)

This invention relates to chemical compounds of the amide type and, more particularly, to alkanolamino-di-fatty acid amides, their salts, and methods for producing them.

The compounds of the invention, in the form of the free bases, may be represented by the formula:

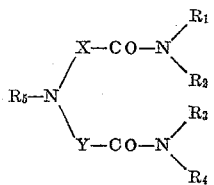

wherein $R_1$ and $R_3$ are intended to stand for lower alkyl radicals while $R_2$ and $R_4$ stand for aralkyl radicals and $R_5$ representing a hydroxy- or acid ester-substituted lower alkyl radical. The designations X and Y are intended to represent divalent lower alkylene radicals. The aralkyl radicals $R_2$ and $R_4$ may represent phenyl- or substituted phenyl-lower alkyl radicals wherein such substituents as lower alkyl, lower alkoxy, hydroxy, halogen, nitro, amino, mono- or di-lower alkylamino radicals may be on the ring. In the case of aralkyls of the β-phenylethyl type, hydroxy substituents on the β-carbon of the alkyl are also contemplated. With regard to $R_5$, the lower alkylene portion of the radical should have from 2 to 4 carbon atoms.

It has been discovered that compounds meeting the described qualifications, whether as the free base or the acid-addition salts, show surprisingly good local anesthetic action. This pharmacological action has been noted for hydroxy-substituted compounds and esters thereof. The replacement of the hydroxy group with an amino radical, for example, destroys the local anesthetic action as found in testing the compound

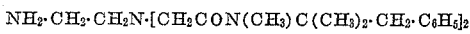

Additionally, where $R_5$ involves a straight-chain alkylene group of more than 4 carbon atoms, no local anesthetic action could be found as discovered in testing

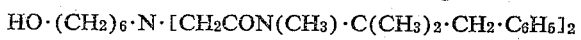

On the other hand, strong local anesthetic action was found where $R_5$ represented a lower alkanol and, similarly, when typical aliphatic, aromatic or heterocyclic or inorganic acid esters of the same compounds were tested. From the accumulated evidence, one may say that the esters are substantial equivalents of the corresponding alkanol compounds and, further, that no prediction with regard to local anesthetic action is possible where $R_5$ represents other radicals.

Compounds falling within the scope of the formula as given above may be used in the form of their acid-addition salts while still retaining their effectiveness for local anesthetic use. The salts provide great flexibility in therapeutic use since they may impart various degrees of water-solubility to an otherwise substantially insoluble base. With regard to the acid-addition salts, either organic or inorganic acids may be used as long as they do not substantially increase the toxicity of the compound. Among the salts considered useful for the purposes indicated are the hydrochloride, sulfate, phosphate, hydrobromide, acetate, tartrate, propionate or succinate.

In preparing the di-fatty acid amides, where the amides are similar, the free bases are prepared by reacting a lower alkanolamine with an alpha-halo-fatty acid amide in a molar ratio of 1:2, but preferably the latter being present in slight excess of this ratio. On the other hand, where the fatty acid amides are dissimilar, as, for example, where X and Y are different alkylene radicals or where $R_1$ differs from $R_3$, the bases are prepared by reacting an alkanolamino-fatty acid amide with a halo-fatty acid amide in a molar ratio of about 1:1. The halogen atom may be either chlorine or bromine. The alkanolamino-fatty acid amide is prepared as taught by the general procedure outlined in the patents to Bruce et al. 2,568,142, dated September 18, 1951, or 2,654,754, dated October 6, 1953, suitably modified, of course, to provide the proper amine and halogenated reactants.

The reaction of the alkanolamine or alkanolamino-fatty acid amide and halo-fatty acid amide is carried out substantially under the conditions as described in the above-mentioned patents. The reaction temperature is in the range of about 80° to about 200° C. but is preferably in the narrower range of about 100 to about 180° C. Alcohols of 3 to 7 carbon atoms, anisole, dioxane, hydrocarbon solvents, such as xylene, or, in fact, any inert solvent boiling within the ranges indicated are suitable, the reaction taking place at the refluxing temperature of the solvent. Acid acceptors or mildly basic material are also provided for the reaction, these acceptors being, for example, pyridine, an alkali or alkaline earth metal oxide, carbonate or bicarbonate or like substances.

The esters are easily formed from the alkanol compounds by known procedures. Typical methods involve reacting the alkanol di-fatty acid amide with an acid, acid anhydride, acid or acyl halide, with the anhydride and halide being preferred. The reaction is carried out in a suitable inert solvent, such as hydrocarbon or chlorinated hydrocarbons, typical examples being benzene, toluene and chloroform. An alkaline material may be provided for the reaction, if necessary, this being either alkali metal hydroxide or carbonate. The temperature for esterification depends on the reactants and may range from about 0° to about 150° C.

The salts may be prepared in any manner known to one skilled in the art. For acid-addition salts, one generally dissolves the free base in a suitable solvent and adds the selected acid thereto. The preparation of acid-addition salts is well known and need not be described here.

The following examples illustrate the preparation of typical compounds falling within the scope of the invention.

EXAMPLE 1

*Preparation of: N,N - bis(N-methyl - N - omega - phenyl-tert.butyl-acetamido)-beta-hydroxyethylamine and salts thereof*

Chlor-N-methyl-N-omega-phenyl-tertiary butyl acetamide (23.95 mgs.) (0.1 mole) is added to n-butanol (150.0 cc.) containing anhydrous potassium carbonate (50.0 gms.). To the stirred refluxing solution is added dropwise freshly distilled ethanolamine (3.1 gms.) (0.05 mole). Stirring and refluxing is maintained for twenty hours. Upon cooling the solution is filtered; the residue is washed with n-butanol. The combined filtrates are washed with aqueous sodium carbonate solution then water and finally dried over anhydrous magnesium sulfate. The solvent is distilled under vacuum having a dry solid residue. The residue is dissolved in dry benzene to which is added n-hexane to crystallize the product melting at 104–104.5° C. Yield 71–73%. Analysis.—Carbon: calc. 71.9%; found 71.93%; hydrogen: calc. 8.8%; found 8.9%; nitrogen: calc. 9.0%; found 9.0%.

To make the hydrochloride salt, the bis-acetamide or, by another name, 1,11-diphenyl-2,2,3,9,10,10-hexamethyl-4,8-diketo-6-(beta-hydroxyethyl)-3,6,9-triazaundecane is dissolved in n-butanol. The solution is chilled and then dry hydrogen chloride gas is passed into the solution causing an oil to separate. To the heavy oil ether is added and then stirred causing crystallization to occur. M. P. 146–147° C. Analysis for nitrogen: calc. 8.3%, found 8.2%.

To make the acetate salt, the bis-acetamide (4.7 gms.) (0.01 mole) is dissolved in ethyl acetate to which is added glacial acetic acid (0.6 gms.) (0.01 mole). Ether is added to precipitate the acetate as a gum which is washed with hexane, and finally added to dry ether. Allow to stand for crystallization. M. P. 141° C. Analysis for nitrogen: calc. 8.0%; found 8.2%.

Other salts are: sulfate, M. P. 56° C.; acid oxalate, M. P. 127° C.; tartrate, M. P. 45° C.; picrate, M. P. 151–152° C.

EXAMPLE 2

*Preparation of: 1,11-diphenyl-2,2,3,9,10-pentamethyl-4,8-diketo-6-(beta-hydroxyethyl)-3,6,9-triazaundecane and salt thereof*

Beta-hydroxyethylamino-N-methyl - N - omega-phenyl-tert. buty acetamide was first prepared by adding 6.1 grams (0.1 mole) of ethanolamine; 23.9 grams (0.1 mole) of chloro-N-methyl-N-omega-phenyl-tert. butyl acetamide and 30 grams of sodium carbonate to 300 cc. of butanol contained in a one liter three-neck flask fitted with a mechanical strirrer, reflux condenser and thermometer. The reaction mixture was refluxed overnight. It was filtered while hot to remove inorganic salts. The salts were washed with butanol. The filtrate was washed once with dilute sodium hydroxide solution and the combined filtrates were washed three times with water. They were then dried over magnesium sulfate and the butanol distilled off under vacuum. After sitting for a few days, the residue solidified. It was recrystallized from n-hexane, M. P. 74.5–76.5 C. N calc. 10.60%, found 10.90%.

Monoethanolamino-N-methyl-N-omega-phenyl-tertiary butyl acetamide (13.2 gms.) (0.05 mole) and chloro-N-2-phenyl-isopropyl-N-methyl acetamide (11.3 gms.) (0.05 mole) are dissolved in 75.0 cc. of n-butanol containing dry potassium carbonate (25.0 gms.). The solution is stirred and refluxed for twenty (20) hours. Upon cooling the solution is filtered and the solid residue is washed with n-butanol. The combined filtrates are washed with aqueous sodium carbonate solution, then water and finally dried over anhydrous magnesium sulfate. The solution is filtered and dry hydrogen chloride gas is passed into the chilled solution. Filter and dry. Analysis for nitrogen: calc. 8.5%, found 8.42%.

EXAMPLE 3

*Preparation of: N,N-bis(N-methyl-N-omega-phenyl-tert. butyl acetamido)-β-methyl-β-hydroxyethylamine*

3.7 grams (0.05 mole) isopropanolamine, 12 grams (0.05 mole) chloro-N-methyl-N-omega-phenyl-tert. butyl acetamide and 10 grams sodium carbonate (0.01 mole) in 100 cc. butanol were heated at refluxing temperature for six hours. An additional 12 grams of chloro-acetamide was added and refluxing continued overnight. The reaction mixture was cooled and filtered. The filtrate was dried over potassium carbonate and concentrated to a syrup under vacuum. The free base was crystallized from ethyl acetate (50 cc.). A second crop was obtained by the addition of petroleum ether until no further precipitation occurred. The product was filtered off and dried, M. P. 113°–114° C. Analysis: Calc. N, 8.74; C, 72.45; H, 8.95. Found: N, 8.68; C, 72.11; H, 8.92.

EXAMPLE 4

*Preparation of: N,N-bis-(N-methyl-N-omega-phenyl-tert. butyl acetamido)-3-hydroxy-n-propylamine and salt thereof*

3.7 grams (0.05 mole) 1,3-propanolamine, 12 grams (0.05 mole) chloro-N-methyl-N-omega-phenyl-tert, butyl acetamide, 10 grams sodium carbonate, and 100 cc. butanol were stirred and refluxed for three hours; 12 grams additional chloro-acetamide was added and refluxing continued overnight. Cooled reaction mixture and filtered. The filtrate was concentrated under vacuum to a syrup. This was dissolved in ether, clarified by filtration, and dry hydrogen chloride added to the filtrate. The precipitated hydrochloride was recrystallized from acetone-methanol. M. P. 164.5–165° C.

Analysis:

|  | N | Cl |
|---|---|---|
| Calc | 8.13 | 6.85 |
| Found | 8.30 | 6.87 |

EXAMPLE 5

*Preparation of: N,N-di-(N-methyl-N-omega-phenyl-tert. butyl acetamido)-1-ethyl-2-hydroxyethylamine and salt thereof*

4.5 grams (0.05 mole) 2-amino-1-butanol, 12 grams chloro-n-methyl-N-omega-phenyl-tert. butyl acetamide and 15 grams sodium carbonate was stirred and refluxed in 150 cc. butanol. After 4 hours 12 grams of the chloro-acetamide was added and refluxing continued overnight. Reaction was cooled, filtered, and filtrate vacuum concentrated to a syrup. Product obtained as hydrochloride from an acetone methanol mixture using dry HCl gas. M. P. 144–145° C.

Analysis:

|  | C | H | N |
|---|---|---|---|
| Found | 67.14 | 8.36 | 7.61 |
| Calc | 67.72 | 8.70 | 7.88 |

EXAMPLE 6

*Preparation of: N,N-di-(N-benzyl-N-2-heptyl-acetamido) isopropanolamine*

Chloro-acetyl-N-benzyl-N-2-heptylamine was first prepared by dissolving 61.5 grams N-benzyl-2-heptylamine (0.3 mole) and 35 grams (0.35 mole) triethylamine in 500 cc. dry benzene. The solution was cooled to 10° C. 39.5 grams (0.35 mole) chloroacetyl-chloride was added dropwise to the stirred, cooled reaction mixture. After addition was complete, the reaction was stirred for 2 hours at room temperature. The precipitate was filtered off, the filtrate washed well with water, dried over anhydrous sodium sulphate. After filtering, the filtrate was concentrated and the residue vacuum distilled. B. P. 168–170°/0.2 mm.

28.2 grams (6.1 mole) chloro-acetyl-N-benzyl-N-2-heptylamine, 3.75 grams isopropanolamine, 60 grams potassium carbonate, and 150 cc. butanol was stirred and refluxed 18 hours. The reaction was cooled, filtered, and filtrate water washed and dried. After concentration the residue was distilled. B. P. 195–210° C./0.01 mm. $n_d^{22}$: 1.5063.

Analysis:

|  | C | H | N |
|---|---|---|---|
| Found | 74.43 | 9.76 | 7.10 |
| Calc | 74.30 | 9.78 | 7.43 |

EXAMPLE 7

*Preparation of: N,N-di-(N-benzyl-N-n-butyl-acetamido)-2-hydroxyethylamine and salt thereof*

Chloro-N-benxyl-N-n-butyl-acetamide was prepared by dissolving 46 grams (0.28 mole) butyl benzylamine in 400 cc. diethylether (anhydrous). To this was added slowly with stirring, 16 grams (0.14 mole) chloroacetyl chloride in 50 cc. ether. The reaction temperature was held at −20 to −10° C. during this addition. The temperature was then allowed to come to room temperature and stirred 3 hours. The precipitate of aminehydrochloride was filtered off and washed with ether. The filtrate was washed with 50 cc. 5% sodium bicarbonate, 100 cc. of water and the ether layer dried with magnesium sulphate. After filtering, the ether solution was concentrated and the residue distilled under vacuum. B. P. 138–140° C./0.25 mm.

Chlor-N-n-butyl-N-benzylacetamide (17.9 gms.) (0.075 mole) is added to n-butanol (150 cc.) containing anhydrous potassium carbonate (50.0 gms.). To the stirred refluxing solution freshly distilled ethanolamine (2.3 gms.) (0.0375 mole) is added dropwise, and refluxing is maintained for twenty hours. Upon cooling the solution is filtered, the residue is washed with n-butanol. The combined filtrates are washed with aqueous sodium carbonate solution then water and finally dried over anhydrous magnesium sulfate. The solution is filtered and dry hydrogen chloride gas is passed into the chilled solution. The white precipitate is filtered and dried. M. P. 118° C. Analysis—Chlorine: calc. 7.15%; found 7.3%.

EXAMPLE 8

*Preparation of: 1,11-diphenyl-2,2,3,9,10-pentamethyl-4,8-diketo-6-(2-hydroxyethyl)-7-ethyl-11 - hydroxy - 3,6,9-triazaundecane and salt thereof*

(A) Methyl-omega-phenyl-tertiary butylamine (489 gms.) (3.01 mole) is dissolved in 3000 cc. of dry toluene. The solution is cooled to −20° to −25° C. and stirred as a solution of chloracetyl chloride (169.5 gms.) (1.5 mole) in 2000 cc. of dry toluene is added slowly. Upon complete addition the stirring of the solid containing toluene is continued until the temperature of the toluene liquid rises to that of room temperature. The solid is separated and the toluene solution after being twice washed with distilled water is dried over magnesium sulfate. The liquid layer is then distilled and the fraction boiling at 164–166° C./1 mm. is collected as product: chlor-N-methyl-N-omega-phenyl-tert.butyl acetamide.

(B) *Ethanolamino-N-methyl-omega - phenyl - tertiary butyl acetamide.*—Chlor-N-methyl-n-omega - phenyl-tertiary butyl acetamide (23.9 gms.) (0.1 mole) is added to 150 cc. of dry n-butanol containing mono-ethanolamine (12.3 gms.) (0.2 mole) and 50 gms. anhydrous potassium carbonate. The mass is stirred and heated under reflux for approximately eighteen hours. Upon cooling, the solid is separated and the butanol solution is washed with five percent aqueous sodium carbonate solution and then three times with 50 cc. of water. The solution is dried over magnesium sulfate and then vacuum distilled to remove n-butanol. Collect as product boiling at 185–187° C./1 mm. The ethanolamino - N - methyl-omega-phenyl-tertiary butyl acetamide is crystallized from ethylacetate, melting at 75–76° C.

(C) *2-bromo-N-methyl-N-(1-phenyl - 1 - hydroxyisopropyl) - butyramide.*—Alpha - (1 - methylaminoethyl) benzyl alcohol (44.7 gms.) (0.3 mole) is dissolved in 250 cc. of dry toluene. The solution is cooled to −20° C. to −25° C. and stirred as a solution of alpha-bromobutyryl chloride (27.0 gms.) (0.15 mole) in 100 cc. dry toluene is added slowly. Upon complete addition the stirring of the solid containing toluene solution is continued until the temperature rises to that of room temperature. The solid is separated and the toluene solution after being twice washed with water is dried over magnesium sulfate. The liquid layer is distilled and the fraction boiling at 160–165° C./1 mm. is collected as product. Analysis—bromine: calc. 26.7%; found 26.6%.

(D) Ethanolamino-N-methyl-omega - phenyl tertiary-butyl acetamide (13.2 gms.) (0.05 mole) is added to 150 cc. of dry n-butanol containing 2-bromo-N-methyl-N-(1-phenyl-1-hydroxyisopropyl) - butyramide (15.0 gms.) (0.05 mole) and 50 gms. of anhydrous potassium carbonate. The mass is stirred and heated under reflux for approximately eighteen hours. Upon cooling the solid is separated and the butanol solution is washed with five percent aqueous sodium carbonate solution and then three times with 50 cc. of distilled water. The solution is dried over anhydrous magnesium sulfate and then vacuum distilled to remove n-butanol. The residue is dissolved in ethanol through which is passed dry hydrogen chloride gas to precipitate the di-fatty acid amide as the hydrochloride, melting at 155° C. Analysis—nitrogen: calc. 7.87%; found 8.1%.

EXAMPLE 9

*Preparation of: 1,11-diphenyl-2,2,3,9,10-pentamethyl-4,8-diketo-6-(2-hydroxyethyl)-11-hydroxy-3,6,9 - triazaundecane and salt thereof*

Alpha - (1-methyl-aminoethyl) benzyl alcohol (ephedrine) (99.0 gms.) (0.6 mole) is dissolved in 750 cc. of dry toluene. The solution is cooled to −20° to −25° C. and stirred as a solution of chloracetyl chloride (67.8 gms.) (0.6 mole) in 250 cc. of dry toluene is added slowly. Upon complete addition the stirring of the solid containing toluene solution is continued until the temperature rises to that of room temperature. The solid is separated and the toluene solution after being twice washed with water is dried over magnesium sulfate. The liquid layer is distilled to remove the toluene.

Ethanolamino-N-methyl-omega-phenyl - tertiary butyl acetamide (13.2 gms.) (0.05 mole) is added to 150 cc. of dry n-butanol containing chloro-N-methyl-N-(1-phenyl-1-hydroxyisopropyl) acetamide (12.1 gms.) (0.05 mole) and 50 grams of anhydrous potassium carbonate. The mass is stirred and refluxed for approximately eighteen hours. Upon cooling the solid is separated and the butanol solution is washed with five percent aqueous sodium carbonate solution and then three times with 50 cc. of distilled water. The solution is dried over anhydrous magnesium sulfate and then vacuum distilled to remove n-butanol. The residue is dissolved in dry methanol through which is passed dry hydrogen chloride gas. Ether is added to precipitate the bis-acetamide-hydrochloride melting at 170–171° C. Analysis—nitrogen: calc. 6.7%; found 6.2%.

EXAMPLE 10

*Preparation of: N,N-di(N-methyl-N-1-methyl - 2 - phenethyl acetamido)-ethanolamine and salt thereof*

22.6 grams (0.1 mole) of chloroacetyl-desoxy-ephedrine, 3 grams (0.05 mole) ethanolamine, 15 grams of sodium carbonate and 150 cc. of N-butanol were mixed and refluxed for 20 hours. After cooling, the reaction mixture was filtered and the filtrate concentrated under vacuum. The residue was taken up in ether-acetone and dry hydrogen chloride was added. The product was concentrated to a syrup and dried under vacuum (0.2 mm.) over phosphorus pentoxide.

EXAMPLE 11

*Preparation of: N,N-di-(N-methyl-N-omega-phenyl-tert.-butylacetamido)-beta-aminoethylacetate and salt thereof*

Into a suitable round-bottomed three-necked flask, equipped with a stirrer, condenser, and a dropping funnel, is placed one part of beta-hydroxy-ethylamino-bis-(N-methyl-omega-phenyl-tert.butyl acetamide), 15 parts of toluene, then added 3 parts of acetic anhydride and 2 parts of anhydrous $K_2CO_3$ (all by weights), and the flask was then immersed in an oil bath at 130° C. for approximately 2 hours with stirring, then filtered hot by suction.

The filtrate was then concentrated into vacuum, 0.3-0.5 mm. Hg, at 50° C. The highly viscous, oil-like residue was dissolved in 15 parts of acetone-ether mixture (ratio 1:14), and saturated with HCl gas to pH=4.0. The flask was allowed to stand for a few hours in the refrigerator, with occasional shaking. Formed crystalline material was then filtered by suction and recrystallized from ether-ethyl acetate or ether-isopropyl alcohol mixture.

One gram of this material is placed in a 50 ml. Erlenmeyer flask, 30 ml. ether added and warmed to boiling. At this point is added dropwise ethyl acetate or isopropyl alcohol, until a clear solution is obtained. The solution is then allowed to stay in the refrigerator for a few hours to crystallize. M. P. 169–171° C., sintering at 160° C.

Analysis:

| Found | Calculated |
|---|---|
| C=66.07% | C=66.02% |
| H= 8.03% | H= 8.06% |
| N= 7.20% | N= 7.50% |

EXAMPLE 12

*Preparation of: N,N-di-(N-methyl-N-omega-phenyl-tert.-butyl - acetamido) - beta - chloro - ethylamine and salt thereof*

Twenty grams (0.042 mole) of N,N-di-(N-methyl-N-omega-phenyl-tert.butyl-acetamido)-ethanolamine was dissolved in 100 cc. chloroform; 5 grams (0.04 mole) thionyl chloride in 25 cc. chloroform was added. The mixture was stirred for 3 hours at 25° C. The solvent was removed under vacuum. The residue crystallized from alcohol-ether as the hydrochloride salt. M. P. 155–156° C. The free base may be obtained by neutralizing the acid-addition salt with sodium hydroxide.

EXAMPLE 13

*Preparation of: N,N-di-(N-methyl-N-omega-phenyl-tert.-butyl-acetamido)-beta-aminoethyl-p-nitrobenzoate*

Five grams (0.01 mole) N,N-bis-(N-methyl-N-omega-phenyl-tert.butyl-acetamido)-ethanolamine hydrochloride was dissolved in 50 cc. ice-cold 15% sodium hydroxide. To this was added 2 grams (0.012 mole) p-nitro-benzoyl chloride in 50 cc. chloroform. This was stirred vigorously for 2 hours with cooling. The organic layer was separated and aqueous layer extracted with chloroform. The total organic solution was washed with water, dried over sodium sulphate. Filtered, and filtrate concentrated to a yellow syrup. Crystallized from petroleum ether-acetone. M. P. 89–90° C. Analysis: N 9.08 (calc.); 8.93 (found).

EXAMPLE 14

*Preparation of: N,N-di-(N-methyl-N-omega-phenyl-tert.-butyl-acetamido)-beta-aminoethyl nicotinate and salt thereof*

Two grams (0.004 mole) N,N-di-(N-methyl-N-omega-phenyl - tert.butyl - acetamido) - beta - hydroxyethylamine was dissolved in 50 cc. dry benzene. 0.9 grams (0.004 mole) nicotinic acid anhydride was added and the reaction refluxed 16 hours. Cooled. Filtered off nicotinic acid (M. P. 234–235° C.). Filtrate concentrated under vacuum to syrup. Taken up in acetone and refiltered. Filtrate treated with dry hydrogen chloride. The precipitate was filtered, washed with acetone and dried. M. P. 158–159° C.

Analysis:

|  | N | Cl |
|---|---|---|
| Found | 8.74 | 11.33 |
| Calc | 8.93 | 11.35 |

We claim:

1. The process comprising heating a lower alkanolamine having 2 to 4 carbon atoms with a halo-fatty acid amide the amido radical having N-lower alkyl and N-phenyl-lower alkyl substituents in a ratio, amine to amide, of at least about 1:2, to a temperature of about 80°–200° C. and separating out the alkanolamino-di-fatty acid amide as a product of the process.

2. A compound of the group consisting of di-fatty acid amides and the non-toxic acid-addition salts thereof, said amides having the general formula

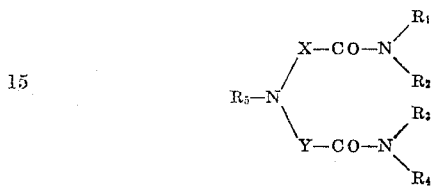

wherein $R_1$ and $R_3$ represent lower alkyl radicals, $R_2$ and $R_4$ stand for aralkyls of the group consisting of phenyl-lower alkyl and beta-phenyl-beta-hydroxy-lower alkyl, $R_5$ represents a lower alkanol of 2 to 4 carbon atoms, with X and Y each representing divalent lower alkylene radicals of 1 to 4 carbon atoms.

3. A compound having the formula

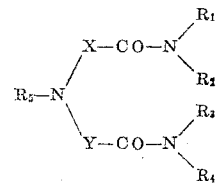

wherein $R_1$ and $R_3$ each represent lower alkyl radicals, $R_2$ and $R_4$ each representing phenyl-lower alkyl radicals, $R_5$ representing a lower alkanol radical of 2 to 4 carbon atoms, with X and Y each standing for a lower alkylene radical.

4. A compound having the formula

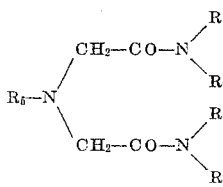

wherein $R_1$ and $R_3$ each represent lower alkyl radicals, $R_2$ and $R_4$ each standing for phenyl-lower alkyl radicals and $R_5$ representing a lower alkanol radical of 2 to 4 carbon atoms.

5. The new compound, N,N-di-(N-methyl-N-omega-phenyl - tert.butyl - acetamido) - 1 - ethyl - 2 - hydroxy - ethylamine.

6. The new compound, N,N-bis(N-methyl-N-omega-phenyl - tert.butyl - acetamido) - beta - methyl - beta - hydroxyethylamine.

7. The new compound, 1,11-diphenyl-2,2,3,9,10-pentamethyl - 4,8 - diketo - 6 - (beta - hydroxyethyl) - 3,6,9 - triazaundecane.

8. The new compound, N,N-bis(N-methyl-N-omega-phenyl - tert.butyl - acetamido) - beta - hydroxyethyl - amine.

References Cited in the file of this patent

UNITED STATES PATENTS

| 2,368,208 | Epstein et al. | Jan. 30, 1945 |
| 2,629,736 | Krimmel | Feb. 24, 1953 |
| 2,629,737 | Krimmel | Feb. 24, 1953 |
| 2,675,378 | Fawcett | Apr. 13, 1954 |
| 2,683,145 | Lyle et al. | July 6, 1954 |